(12) United States Patent
Ohashi et al.

(10) Patent No.: US 7,124,870 B2
(45) Date of Patent: Oct. 24, 2006

(54) POWER TRANSMITTING MECHANISM AND POWER TRANSMITTING METHOD

(75) Inventors: Kaishi Ohashi, Tokyo (JP); Takashi Maeno, Tokyo (JP); Kenjiro Takemura, Tokyo (JP); Tatsuya Koyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 10/822,097

(22) Filed: Apr. 9, 2004

(65) Prior Publication Data

US 2004/0206596 A1    Oct. 21, 2004

(30) Foreign Application Priority Data

Apr. 18, 2003  (JP) ............................. 2003-114296
Mar. 17, 2004  (JP) ............................. 2004-076393

(51) Int. Cl.
    *H02N 2/00*    (2006.01)
(52) U.S. Cl. .................... 192/84.9; 192/84.1; 310/325; 310/369
(58) Field of Classification Search .................... None
     See application file for complete search history.

(56) References Cited

U.S. PATENT DOCUMENTS 5,678,672 A  * 10/1997 Sudau ....................... 192/84.1
5,942,838 A  *  8/1999 Lee et al. ................... 310/333
6,964,327 B1 * 11/2005 Chang et al. .............. 192/84.9

FOREIGN PATENT DOCUMENTS

JP    2002-048155 A    2/2002
JP    2002-181072 A    6/2002

* cited by examiner

*Primary Examiner*—Saul Rodriguez
(74) *Attorney, Agent, or Firm*—Canon U.S.A. Inc/ I.P. Div (57) ABSTRACT

A mechanism for mechanically coupling a driving source and a driven member. The mechanism includes a first member coupled to the driving source and a second member coupled to the driven member. A resilient member exerts a force to bring the first and second members into pressure contact at a contact surface. A vibration is excited in the contact surface of the first member to produce a levitation force, based on an ultrasonic levitation, acting upon the second member. Frictional force between the first member and the second member is changed depending on the levitation force, thereby changing power transmitted between the first member and the second member.

11 Claims, 8 Drawing Sheets

POWER TRANSMITTING MECHANISM AND POWER TRANSMITTING METHOD

BACKGROUND OF THE INVENTION

1. Field of the Invention

The present invention relates to a power transmitting mechanism and a power transmitting method for switching over a transmission state of power from the driving side to the driven side.

2. Description of the Related Art

There is known a power transmitting mechanism, such as a clutch, for transmitting power generated by a power generating source, such as a motor, to a driven member.

Japanese Patent Laid-Open No. 2002-181072, for example, discloses a power transmission mechanism in which a flywheel is fixed to a rotary shaft of a power generating source and a center hub having a friction disk fitted to the hub is fixed to a rotary shaft of a driven member. The friction disk is brought into pressure contact with the flywheel through a spring arranged in a circumferential form, whereby torque generated from the power generating source is transmitted to the driven member with frictional force developed between the flywheel and the friction disk. The spring is supported by a cover, and a part of the spring on the outer peripheral side with respect to a supported portion presses the friction disk through a pressure plate. When a part of the spring on the inner peripheral side with respect to the supported portion is moved toward the flywheel, the part of the spring on the outer peripheral side with respect to the supported portion is moved away from the flywheel. Hence, the pressure contact between the friction disk and the flywheel is released and transmission of the torque is interrupted.

There is also known an electromagnetic clutch for switching over transmission and non-transmission of torque by using electromagnetic force. Japanese Patent Laid-Open No. 2002-048155, for example, discloses an electromagnetic clutch in which an output portion of a power generating source and a rotor are coupled to each other through a belt, and a hub rotating in union with an armature is fixed to a rotary shaft of a driven member. By exciting stator disposed inside the rotor having a C-shaped (or channel-like) section, the armature and the rotor are attracted to contact with each other, whereupon torque generated from the power generating source is transmitted to the driven member. By releasing the stator from the excited state, the electromagnetic force disappears and the armature and the rotor are separated from each other by spring force of a leaf spring member. Hence, transmission of the torque is interrupted.

However, those power transmission mechanisms have a limit in reducing the size because they require a large number of parts and have a complicated structure.

More specifically, the power transmitting mechanism as disclosed in Japanese Patent Laid-Open No. 2002-181072 requires a mechanical arrangement for moving the part of the spring on the inner peripheral side toward the flywheel when the clutch is decoupled, thus resulting in a complicated structure and a larger size.

In the power transmitting mechanism as disclosed in Japanese Patent Laid-Open No. 2002-048155, the clutch can be coupled by easily exciting the stator with energization of an electromagnetic coil contained inside the stator. However, problems arise in that response is poor because of attraction with excitation of the electromagnetic coil, and consumption of electricity is large because attraction force overcoming the load is required during transmission of power.

SUMMARY OF THE INVENTION

With the view of solving the problems set forth above, the present invention is directed to a power transmitting mechanism and a power transmitting method, which can electrically control switching-over of a transmission state of power and which can realize a size reduction and an improvement of response.

In one aspect of the present invention, a mechanism for coupling first and second structures together, said mechanism comprising a first member coupled to said first structure; a second member coupled to said second structure; a contactor exerting a contact force to bring said first member into contact with said second member; and wherein said second member is capable of generating a levitation force opposing said contact force and acting upon said first member.

In another aspect of the present invention, a method of controlling mechanical coupling of first and second structures together, said method comprising the steps of coupling the first structure to a first member having a surface; coupling the second structure to a second member; pressing said first and second members together at said surface with a contact force such that a frictional force is generated between said first and second members; and generating a levitation force at said surface opposing said contact force so as to change said frictional force.

With the present invention, since a vibrator (first member) and a movable member (second member) are relatively pressed into pressure contact with each other and a vibration is excited in the vibrator to produce levitation force opposing the pressing force applied to the movable member, it is possible to provide a power transmitting mechanism and a power transmitting method, which can easily control efficiency of power transmission between the vibrator and the movable member, and which can realize a size reduction and an improvement of response.

Further objects, features and advantages of the present invention will become apparent from the following description of the preferred embodiments with reference to the attached drawings.

DESCRIPTION OF THE PREFERRED EMBODIMENTS

First Embodiment

Figure 1A:
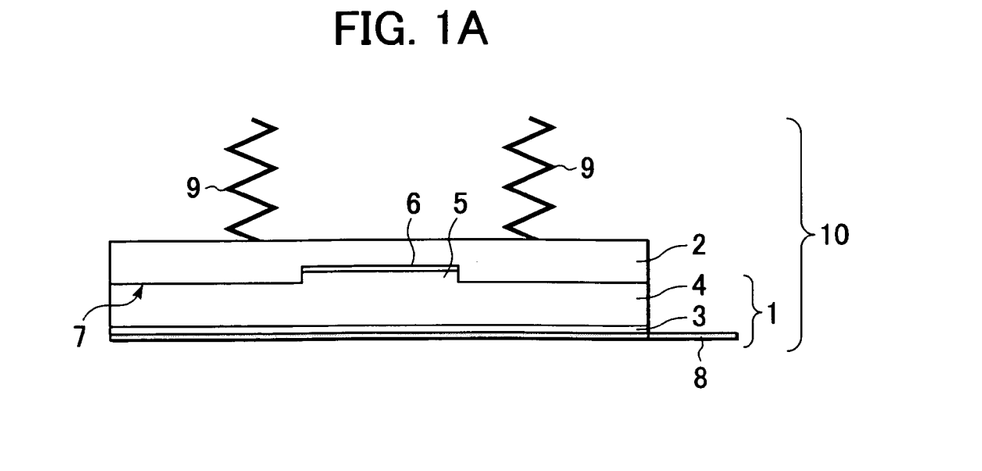
FIGS. 1A and 1B are respectively a sectional view and a perspective view showing, by way of example, a power transmitting mechanism according to a first embodiment of the present invention.
Figure 1B:
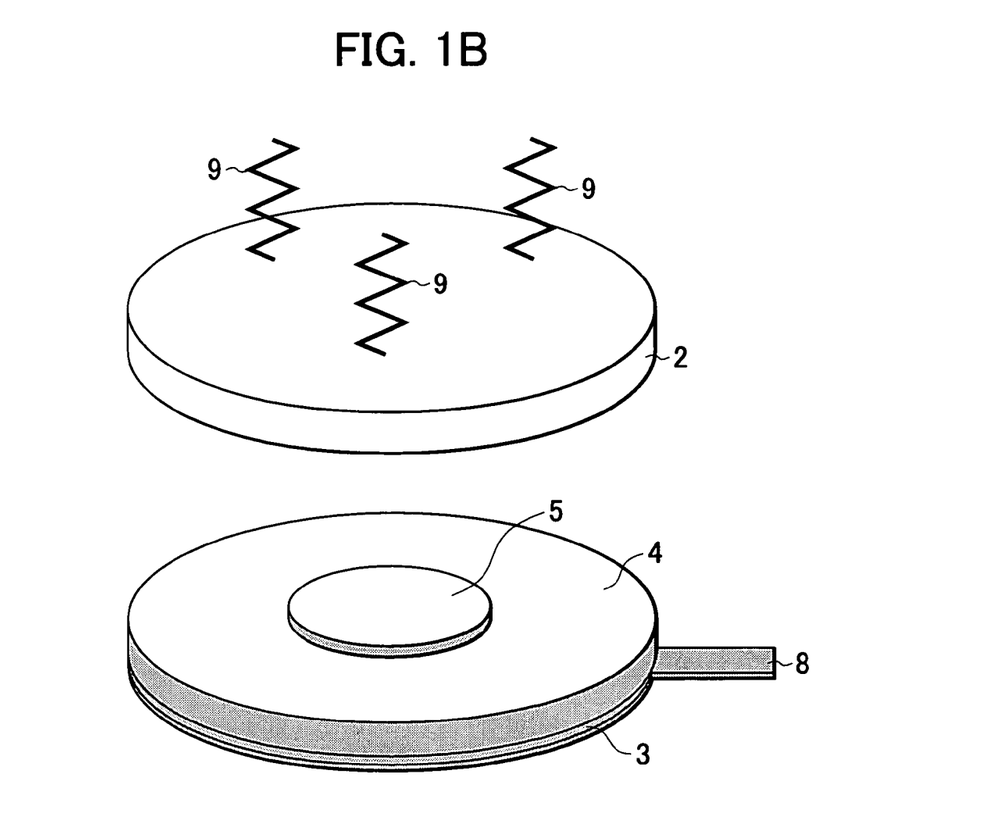

FIGS. 1A and 1B are respectively a sectional view and an exploded perspective view of a power transmitting mechanism 10 showing a vibrator 1 and a moveable member 2 according to a first embodiment of the present invention.

Numeral 10 denotes the power transmitting mechanism. The power transmitting mechanism 10 includes the vibrator 1 and the moveable member 2. The vibrator 1 receives a rotating torque from a power generating source, such as a motor or an engine (not shown). The movable member 2 is connected to a driven member (not shown) and, when coupled to the vibrator 1, receives the rotating torque from the vibrator 1 to rotate the driven member. In order to develop frictional forces between the vibrator 1 and the movable member 2, a resilient member, such as a coil spring 9, capable of exerting a resilient force, applies a uniform vertical load onto the movable member 2, so that the vibrator 1 and the movable member 2 are brought into pressure contact with each other. As an alternative, the vibrator 1 may be connected to the driven member and the movable member 2 may be connected to the power generating source.

The vibrator 1 includes a disk-shaped vibrating body 4 having two opposing surfaces. The vibrating body 4 can be made of brass or other like materials. At the center on one of its surfaces is provided a projection 5. A disk-shaped piezoelectric device 3, serving as an electro-mechanical energy transducer, is affixed to the opposing surface of the vibrating body 4 with an epoxy resin, for example. The movable member 2, which can be made of steel or other like material, has a recess 6 defined at its center thereof adapted to receive the projection 5 of the vibrating body 4. For the purpose of preventing corrosion, one or both of contact surfaces of the vibrating body 4 and the movable member 2 are treated by any of plating, nitriding, lapping and polishing, or a combination of these processes thereof.

The recess 6 of the movable member 2 has a diameter slightly larger than that of the projection 5 of the vibrating body 4. As such, when the projection 5 is fitted in the recess 6 of the movable member 2, the vibrator 1 and the movable member 2 can freely rotate, but movement in the radial direction is minimal.

Figure 2:
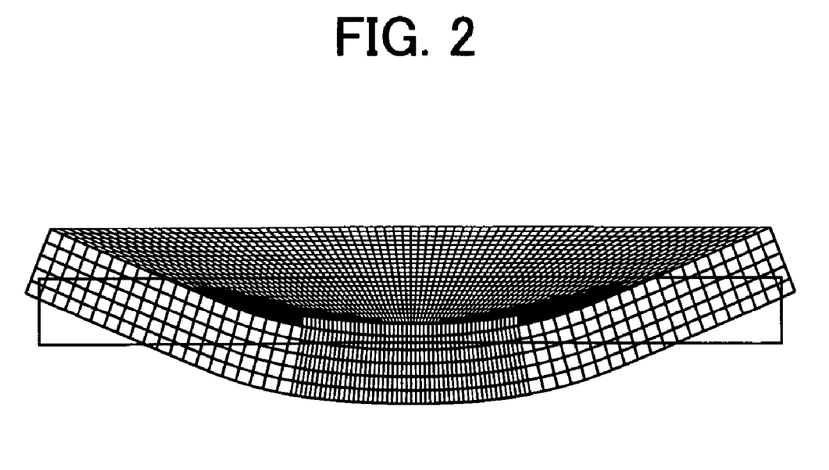
FIG. 2 depicts a vibration state of the power transmitting mechanism shown in FIG. 1.

A flexible board 8 is fixed to the piezoelectric device 3 of the vibrator 1, and an AC voltage is supplied to a polarization region of the piezoelectric device 3 from a driving control circuit (not shown). In this first embodiment, when an AC voltage is supplied to the piezoelectric device 3, there occurs in the vibrator 1 an out-of-plane bending vibration that has one node concentric with the vibrator 1. FIG. 2 is a sectional view of the vibrator 1 divided along a plane passing the center of the vibrator 1 and depicts the out-of-plane bending vibration at one moment. A voided rectangle in FIG. 2 represents the vibrator 1 in a state where no AC voltage is supplied to the piezoelectric device 3. It is understood from FIG. 2 that the vibrator 1 produces the out-of-plane bending vibration with a node located near a middle point of the radius. The natural frequency of the out-of-plane bending vibration, shown in FIG. 2, generated in the vibrator 1 of this embodiment is about 20.35 kHz. This out-of-plane bending vibration is a stationary wave.

The operational principle of the power transmitting mechanism 10 of this embodiment will be described below.

The power transmitting mechanism 10 of this embodiment utilizes ultrasonic levitation based on radiant pressure of an ultrasonic wave. The term "radiant pressure" means one type of time-basis average pressure acting upon an object placed in a sound field and can be said as being a DC component of fluctuating pressure. The radiant pressure is absorbed by the object and lowers along a path of a sound wave, and a resulting DC pressure difference between minute zones generates a flow in a fluid. By utilizing such a phenomenon, it is possible to produce a levitation force acting upon an object placed in a sound field and to sustain the object in a state of levitation at a certain position in a space in a non-contact manner. This is called ultrasonic levitation.

It is known that the levitation force produced by ultrasonic levitation is proportional to the square of a vibration amplitude. An AC voltage of frequency near the natural frequency of the vibrator 1 is supplied to the piezoelectric device 3 so as to excite vibration displacements in a contact surface 7 of the vibrator 1 with the movable member 2, while the vibration state of the vibrator 1 is made closer to a resonance state. At that time, strong radiant pressure due to an ultrasonic wave is generated in the contact surface 7, thus causing the movable member 2 to receive a levitation force opposing the pressing force applied between the vibrator 1 and the movable member 2 from the coil spring 9. Correspondingly, the frictional force between the vibrator 1 and the movable member 2 is reduced.

When rotating torque is applied to the vibrator 1 from the power generating source in a state in which no AC voltage is supplied to the piezoelectric device 3 of the vibrator 1, the vibrator 1 and the movable member 2 are rotated together by the frictional force between the vibrator 1 and the movable member 2, whereupon the rotating torque is transmitted from the vibrator 1 to the movable member 2 and the driven member is rotated.

On the other hand, when an AC voltage of frequency higher than the natural frequency of the vibrator 1 is supplied to the piezoelectric device 3 of the vibrator 1 and the frequency of the AC voltage is gradually lowered to approach the natural frequency, the amplitude of vibration generated in the contact surface 7 of the vibrator 1 gradually increases, thus developing the above-mentioned ultrasonic levitation. When the frequency of the AC voltage is further lowered closer to the natural frequency to increase the vibration amplitude of the vibrator 1 to such an extent that the levitation force acting upon the movable member 2 is larger than the pressing force applied from the coil spring 9, the contact surface 7 of the vibrator 1 and the movable member 2 are separated from each other into a non-contact state (while the projection 5 of the vibrator 1 and the recess 6 of the movable member 2 still remain fitted to each other). Therefore, static frictional force and dynamic frictional force between the contact surface 7 of the vibrator 1 and the movable member 2 become zero. In this state, even when the vibrator 1 is rotated, the rotating torque of the vibrator 1 is not transmitted to the movable member 2.

Thus, the power transmitting mechanism 10 of the first embodiment constitutes a clutch with the function of switching over transmission and non-transmission of torque. Since the power transmitting mechanism 10 comprises the vibrator 1 made up of the piezoelectric device 3 and the vibrating body 4, the movable member 2, and the resilient member, such as the coil spring 9, for bringing the vibrator 1 and the movable member 2 into pressure contact with each other, the number of parts can be cut and the configuration can be simplified. Consequently, a size reduction can be realized. Further, since a large contact surface is obtained between the vibrator 1 and the movable member 2, it is possible to develop frictional force sufficiently endurable against a load imposed during the transmission of torque.

Even when the levitation force acting upon the movable member 2 is smaller than the pressing force applied from the coil spring 9, the levitation force reduces a load that the vibrator 1 receives from the movable member 2, whereby the frictional force between the vibrator 1 and the movable member 2 is reduced. Accordingly, the frictional force between the vibrator 1 and the movable member 2 can be continuously controlled by changing a value of the amplitude or frequency of the AC voltage supplied to the piezoelectric device 3 to change the magnitude of vibration generated in the contact surface 7 of the vibrator 1 and hence to change the levitation force acting upon the movable member 2. In comparison with the case of using an electromagnetic coil as in the related art, the vibration generated in the vibrator 1 is much superior in response to the AC voltage supplied to the piezoelectric device 3.

The frequency of the vibration generated in the vibrator 1 is preferably not less than 20 kHz. The reason is that the power transmitting mechanism operates outside the audible range and therefore a quiet mechanism can be obtained. Also, the reason why the vibrator 1 is in the form of a plate resides in reducing dynamic rigidity of the vibrator 1 under the out-of-plane bending vibration, thereby lowering the resonance frequency and increasing the magnitude of the vibration. Incidentally, when the vibration frequency excited in the vibrator 1 is about the natural frequency of the vibrator 1, the magnitude of the vibration in the vibrator 1 is maximized, and therefore the levitation force produced by ultrasonic levitation. The pressing force applied between the vibrator 1 and the movable member 2 may be set depending on the maximum magnitude of the levitation force. As a matter of course, the larger the pressing force, the larger is the frictional force between the vibrator 1 and the movable member 2 produced when no AC voltage is supplied to the piezoelectric device 3.

By configuring the vibrator 1 having a circular shape, the contact area between the vibrator 1 and the movable member 2 remains constant even when the vibrator 1 and the movable member 2 rotate relative to each other. As such, the levitation force produced based by ultrasonic levitation is maintained constant, and therefore a clutch designed to operate with more stability.

Further, by generating vibration having a circular node in the vibrator 1 as shown in FIG. 2, the mode of the vibration generated in the vibrator 1, and therefore the levitation force, is uniform in the circumferential direction. This design feature is also effective in stabilizing the operation of the clutch.

As described above, the power transmitting mechanism includes the movable member and the vibrator, which is supplied with an alternating signal (AC current) to excite a vibration in its surface. The movable member is pressed to contact with the surface of the vibrator in which the vibration is excited. The vibrator and the movable member can move away from each other against the pressing force in the direction in which the contact between the vibrator and the movable member is released, e.g., in the direction perpendicular to the surface in which the vibration is excited. With such a construction, a power transmitting mechanism, e.g., a clutch, having a much smaller size than that in the related art can be obtained.

Figure 7:
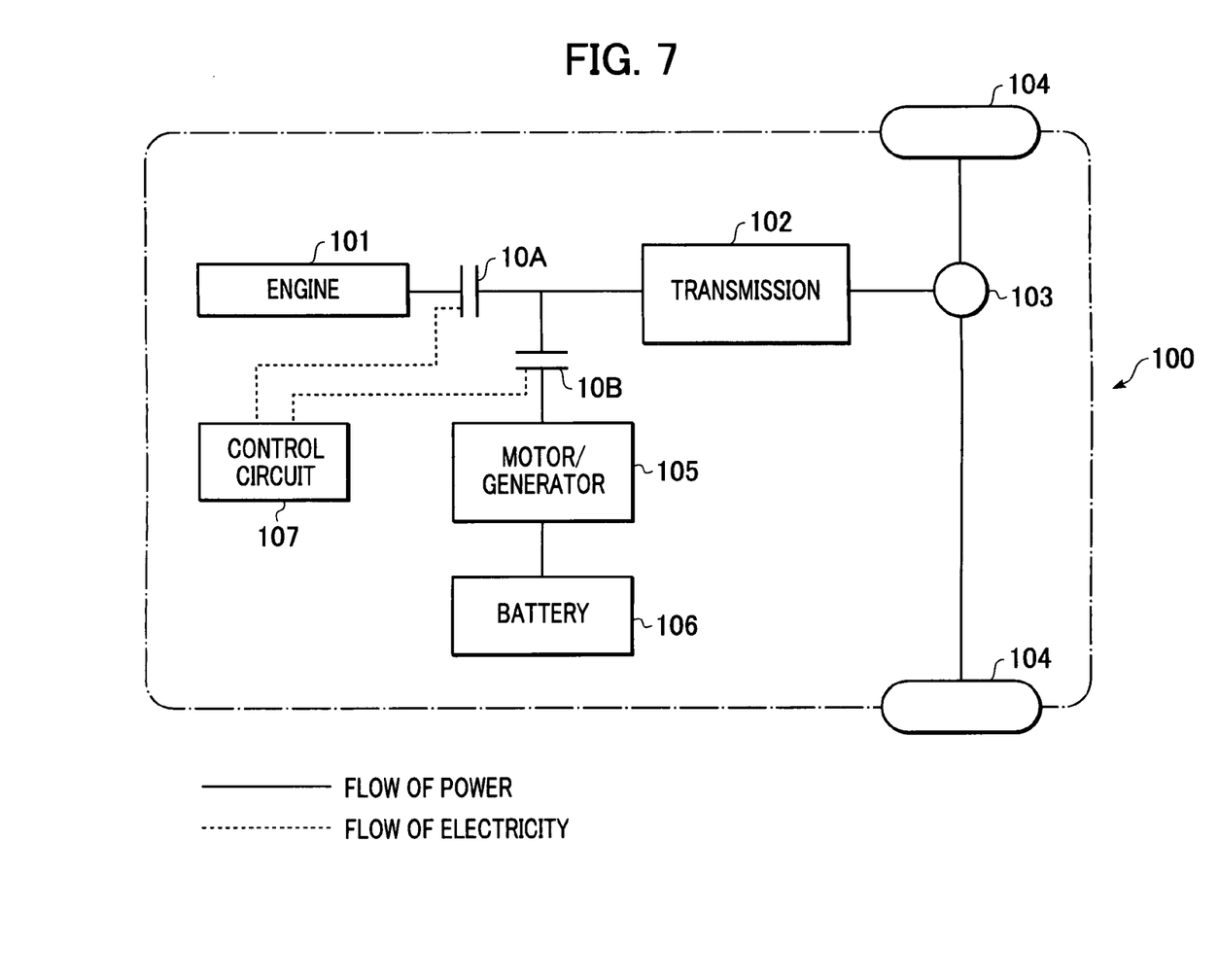
FIG. 7 schematically shows a construction of a hybrid car using the power transmitting mechanism shown in FIG. 1.

An example of an apparatus employing the power transmitting mechanism 10 will be described below. FIG. 7 shows a hybrid car 100 employing the power transmitting mechanism 10 of the first embodiment.

Various types of hybrid cars are proposed. In one type, an electric generator is driven by an engine, and a motor driven by generated electricity drives drive wheels. In another type, driving force of a motor and driving force of an engine are selectively switched over for driving of drive wheels. In still another type, power of an engine is divided into two parts, one of which directly drives drive wheels and the other of which is used to generate electricity for driving a motor. The following description is made of, by way of example, the parallel type of hybrid car in which driving force of a motor and driving force of an engine are selectively switched over for driving of drive wheels.

Numeral 100 denotes a body of the hybrid car. A first clutch 10A is coupled to an output shaft of an engine 101. An input shaft extending from the clutch 10A is connected to a transmission 102, and an output shaft of the transmission 102 is connected to a differential gear 103. An output of the differential gear 103 is transmitted to drive wheels 104 through an axle. A motor/generator 105 is coupled to the input side of the transmission 102 through a second clutch 10B in parallel to the engine 101 as viewed from the transmission 102. The motor/generator 105 operates as an electric motor while consuming electricity supplied from a battery 106, or as an electric generator for generating electricity to be accumulated in the battery 106. In such an arrangement, the clutches 10A, 10B have the same construction as the power transmitting mechanism 10 described above. A control circuit 107 supplies an AC voltage to the clutches 10A, 10B, thereby selectively disengaging coupling between the input side and the output side of each clutch.

At startup of the hybrid car in which the engine efficiency is low, the control circuit 107 holds both the first clutch 10A and the second clutch 10B in the coupled state. When car speed reaches a predetermined value, the control circuit 107 supplies an AC voltage to the second clutch 10B to develop ultrasonic levitation so that the second clutch 10B is brought into the decoupled state. Therefore, the driving force of the engine 101 is transmitted only to the transmission 102. When the car is braked to stop, the control circuit 107 supplies an AC voltage to the first clutch 10A to bring it into the decoupled state, thus causing the motor/generator 105 to accumulate electricity in the battery 106 while the rotation of the input shaft of the transmission 102 is utilized as input energy.

With that construction, a hybrid car can be provided which is able to selectively switch output of the engine and input/output of the motor/generator 105 by employing the power transmitting mechanism described above.

Figure 8:
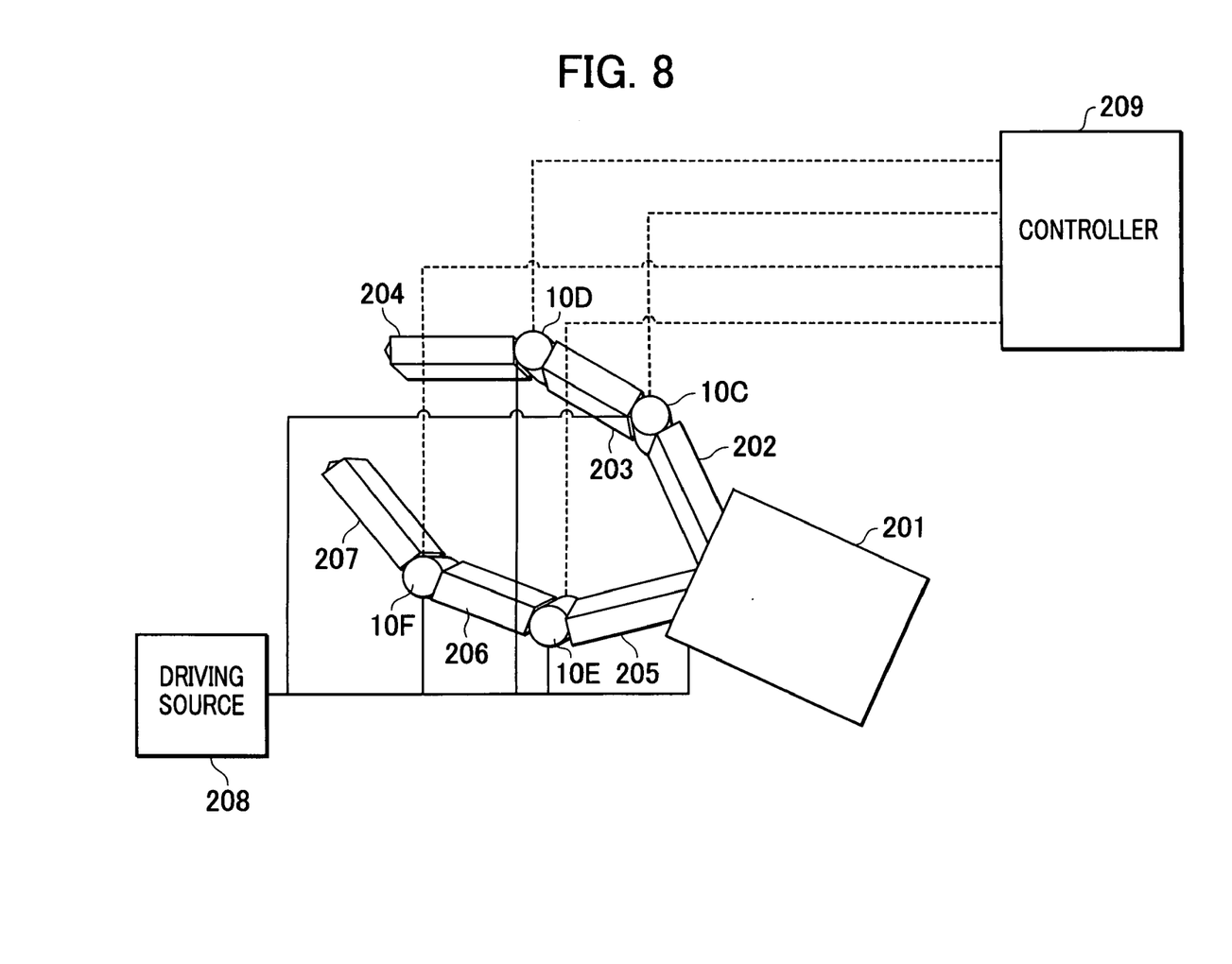
FIG. 8 schematically shows a construction of a robot arm using the power transmitting mechanism shown in FIG. 1.

FIG. 8 shows a robot arm employing the power transmitting mechanism of the first embodiment. Numeral 201 denotes a support corresponding to a human arm, and 202 to 207 denote finger segments. Power transmitting mechanisms 10C to 10F are joined between ends of the finger segments 202 to 207. Each of the power transmitting mechanisms 10C to 10F includes a stator joined to one of two adjacent finger segments, and a movable member jointed to the other of the two adjacent finger segments. A driving source 208 is coupled to the respective stators of the power transmitting mechanisms 10C to 10F. By operating the driving source 208, power is transmitted to the respective stators of the power transmitting mechanisms 10C to 10F in the direction in which the fingers are opened, or in the direction in which the fingers are closed. Numeral 209 denotes a controller for the power transmitting mechanisms 10C to 10F. The controller 209 supplies respective AC voltages to the power transmitting mechanisms 10C to 10F in an independent way.

In order to open or close the fingers, the frequency and amplitude of AC voltages can be varied from mechanism to mechanism. As such, each power transmitting mechanisms 10C to 10F can have different power transmission efficiencies so that each power transmitting mechanism operates in a different way. In spite of only one driving source being used, therefore, it is possible to bend the fingers following the shape of an object to be grasped, or to adjust a degree of grasping force.

Second Embodiment

Figure 3:
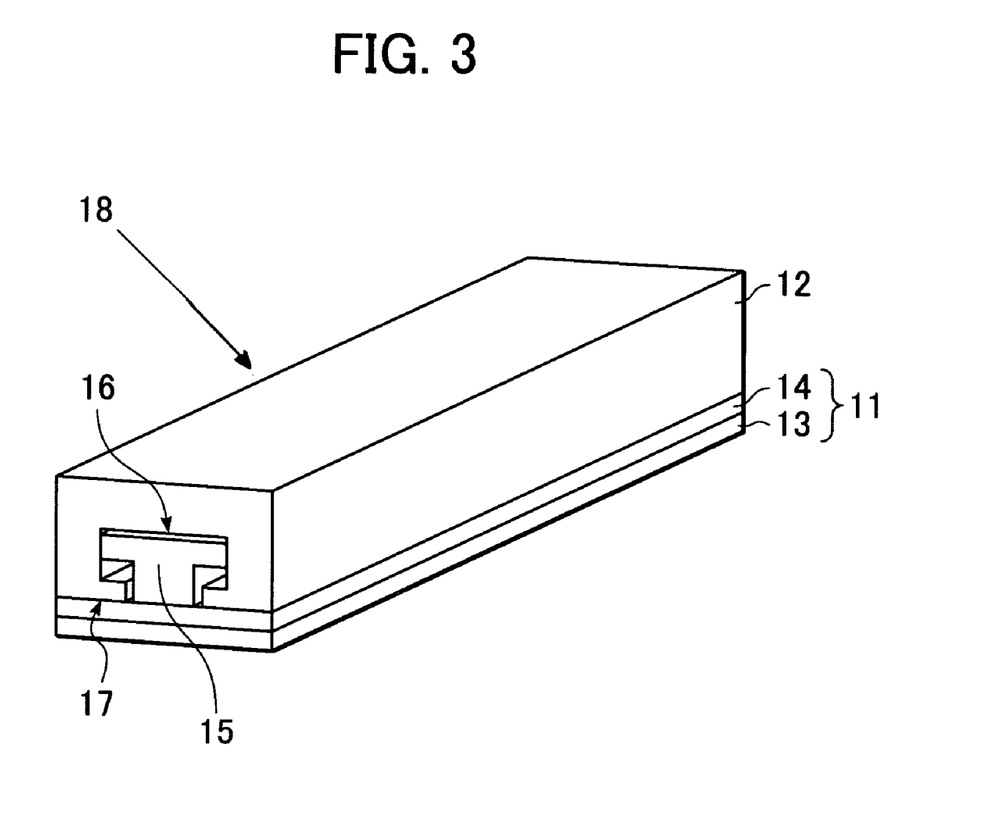
FIG. 3 is a perspective view showing, by way of example, a power transmitting mechanism according to a second embodiment of the present invention.

FIG. 3 is a perspective view of a power transmitting mechanism 18 according to a second embodiment of the present invention.

Numeral 11 denotes a vibrator, and numeral 12 denotes a movable member. In order to develop frictional force between the vibrator 11 and the movable member 12, a uniform vertical load is applied to the movable member 12 by a resilient member, such as a spiral spring (not shown), so that the vibrator 11 and the movable member 12 are brought into pressure contact with each other.

The vibrator 11 includes a vibrating body 14, which can be a rectangular plate made from stainless-steel, and a piezoelectric device 13 having a corresponding rectangular plate shape. On one surface of the vibrating body 14, a projection 15 having a general T-shape cross-section is provided at the center and extending along its length. On an opposing surface, the vibrating body 14 is affixed to the piezoelectric device 13 by brazing, for example.

The movable member 12 can be made of a resin or other like material. The movable member 12 includes a recess 16 defined at its center and extending along its length. The recess is sized and shaped to receive the projection 15 of the vibrating body 14. Reference number 17 denotes a contact surface of the vibrating body defined where a lower surface of the movable member 12, i.e., the one surface thereof except for region defined by the recess 16, contacts a surface of the flat plate of the vibrating body 14, but not the projection 15. As in the first embodiment, when an AC voltage is supplied to the piezoelectric device 13 of the vibrator 11 from a driving control circuit (not shown) through a flexible board (not shown), an out-of-plane bending vibration is generated in the contact surface 17 of the vibrator 11.

As stated above, the recess 16 is sized and shaped to receive the projection 15, which has the generally T-shaped cross-section with a narrow root portion. The recess 16 is formed such that its width is narrowed at an opening end to receive the narrow root portion of the projection 15 of the vibrating body 14. The width of the recess 16 at the bottom (opposed to the opening end) is defined slightly larger than that of the projection 15 at its distal end. Therefore, the vibrator 11 and the movable member 12 can slide relatively free in the lengthwise direction, but sliding in a direction perpendicular to the lengthwise direction is minimal. Even if a large external force acts upon the vibrator 11 and the movable member 12 in the direction vertical to the contact surface 17, these two components do not disengage from each other because the open end of the recess 16 of the movable member 12 is narrower than the distal end of the projection 15 of the vibrating body 14. Also, providing the vibrating body 14 having the projection 15 contributes to lowering the natural frequency of the vibrator 11, based on the mass effect of the projection 15, and increasing the magnitude of the out-of-plane bending vibration generated in the contact surface 17. As a result, a wider transmittable range of driving force can be provided.

There is a gap between the widened distal end of the projection 15 of the vibrating body 14 and the narrowed open end of the recess 16 of the movable member 12 so that the vibrator 11 and the movable member 12 are allowed to move in the direction away from each other. The size of the gap is configured sufficiently larger than the magnitude of the vibration generated in the vibrator 11.

When the out-of-plane bending vibration is excited in the contact surface 17 of the vibrator 11 to produce a levitation force acting upon the movable member 12, the vibrator 11 and the movable member 12 are brought into a non-contact state and the frictional force between them becomes zero. In this state, even when a driving force is applied to the vibrator 11 to move it in the lengthwise direction, the driving force is not transmitted to the movable member 12. Thus, a linearly operating clutch mechanism can be obtained with the second embodiment.

Third Embodiment

Figure 4:
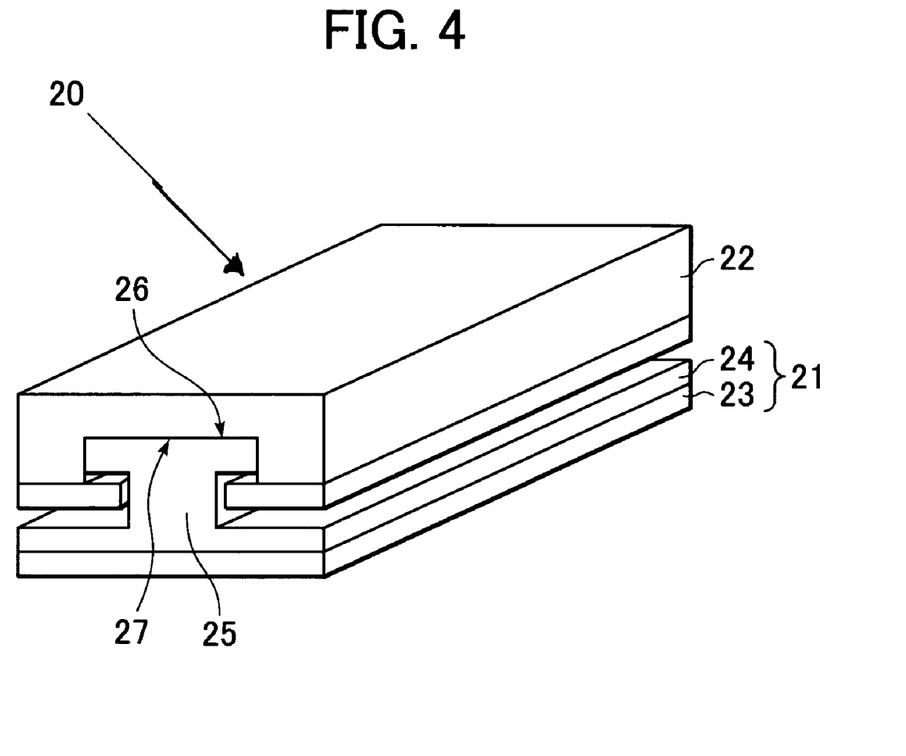
FIG. 4 is a perspective view showing, by way of example, a power transmitting mechanism according to a third embodiment of the present invention.

FIG. 4 is a perspective view of a power transmitting mechanism 20 according to a third embodiment of the present invention.

The power transmitting mechanism 20 includes a vibrator 21 and a movable member 22. The vibrator 21 includes a piezoelectric device 23 and a vibrating body 24. On one surface, the vibrating body 24 is fixed to the piezoelectric device 23. On an opposing surface, the vibrating body has a projection 25 extending therefrom, and the movable member 22 includes a recess 26 sized and shaped to receive the projection 25 of the vibrating body 24.

The power transmitting mechanism 20 shown in FIG. 4 differs from the second embodiment shown in FIG. 3 only where the vibrating body contacts the movable member. The vibrating body 24 contacts the movable member 22 at a contact surface 27, which is a surface of a distal end of the projection 25 of the vibrating body 24. When a vibration is excited in the vibrator 21, the distal end of the projection 25 hardly deforms in itself, and a uniform displacement distribution is obtained at the distal end of the projection 25. As a result, the contact surface 27 can produce a uniform levitation force, and therefore a power transmitting mechanism operating in a stable way can be provided.

Fourth Embodiment

Figure 5:
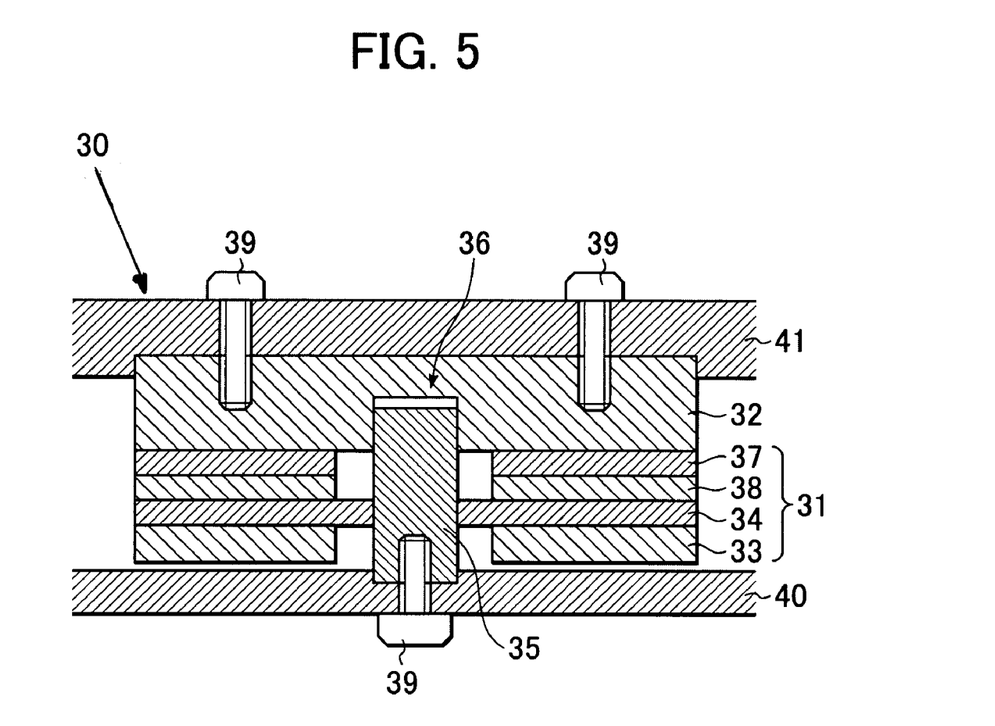
FIG. 5 is a sectional view showing, by way of example, a power transmitting mechanism according to a fourth embodiment of the present invention.

FIG. 5 is a sectional view of a power transmitting mechanism 30 according to a fourth embodiment of the present invention.

Numeral 31 denotes a vibrator fixed by a screw 39 to an output member 40 for receiving rotating torque supplied from a power generating source through a belt, and 32 denotes a movable member fixed to a driven member 41 by other screws 39. The vibrator 31 includes a disk-shaped elastic member 34 having a shaft portion 35 provided at the center, a piezoelectric device 33 bonded to one (lower) surface of the elastic member 34 by using a ultraviolet curing adhesive or the like, a magnet 38, such as a neodymium-based magnet, fixed to the other (upper) surface of the elastic member 34, and a friction member 37 fixed to the neodymium-based magnet 38. The piezoelectric device 33, the friction member 37, and the neodymium-based magnet 38 are not in contact with the shaft portion 35, and so the vibrator 31 has ring-shaped recess around the shaft portion 35 on both sides of the elastic member 34. The movable member 32 has a disk shape and is made of a magnetic material. The movable member 32 has defined at its center a recess 36 sized and shaped to receive the shaft portion 35 of the elastic member 34. As in the power transmitting mechanism shown in FIG. 1, when the shaft portion 35 is fitted into the recess 36, the vibrator 31 and the movable member 32 can move freely in the rotating direction, but movement in the radial direction is minimal. Further, as in the vibrator shown in FIG. 1, an out-of-plane bending vibration having one concentric node is excited in the vibrator 31.

The movable member 32 and the driven member 41, which is fixed to the movable member 32, are brought into pressure contact with the vibrator 31 under an attractive force generated between the neodymium-based magnet 38 and the movable member, which is made of a magnetic material. By utilizing attraction forces (or repulsion forces in some cases), the resilient member, such as the coil spring, and a case for supporting the resilient member are not required. Accordingly, a power transmitting mechanism having a smaller size can be constructed.

The recesses defined around the shaft portion 35 of the vibrator 31 allow for a low-rigidity region around the shaft portion 35 which is used for fixing the vibrator 31 to the output member 40, and making the vibration magnitude of the shaft portion 35 sufficiently smaller than that of the friction member 37. This enables the friction member 37 to satisfactorily vibrate even with the shaft portion 35 fixed to the output member 40. Hence, attenuation of the vibration in the vibrator 31 is reduced and power consumption can be minimized.

In the power transmitting mechanism of the fourth embodiment, as in the first embodiment shown in FIG. 1, when an AC voltage is supplied to the piezoelectric device 33, the out-of-plane bending vibration is excited in the friction member 37, thus producing a levitation force to act upon the movable member 32. By varying the magnitude of the excited vibration, it is possible to change the rotating torque transmitted from the vibrator 31 to the movable member 32.

Fifth Embodiment

Figure 6:
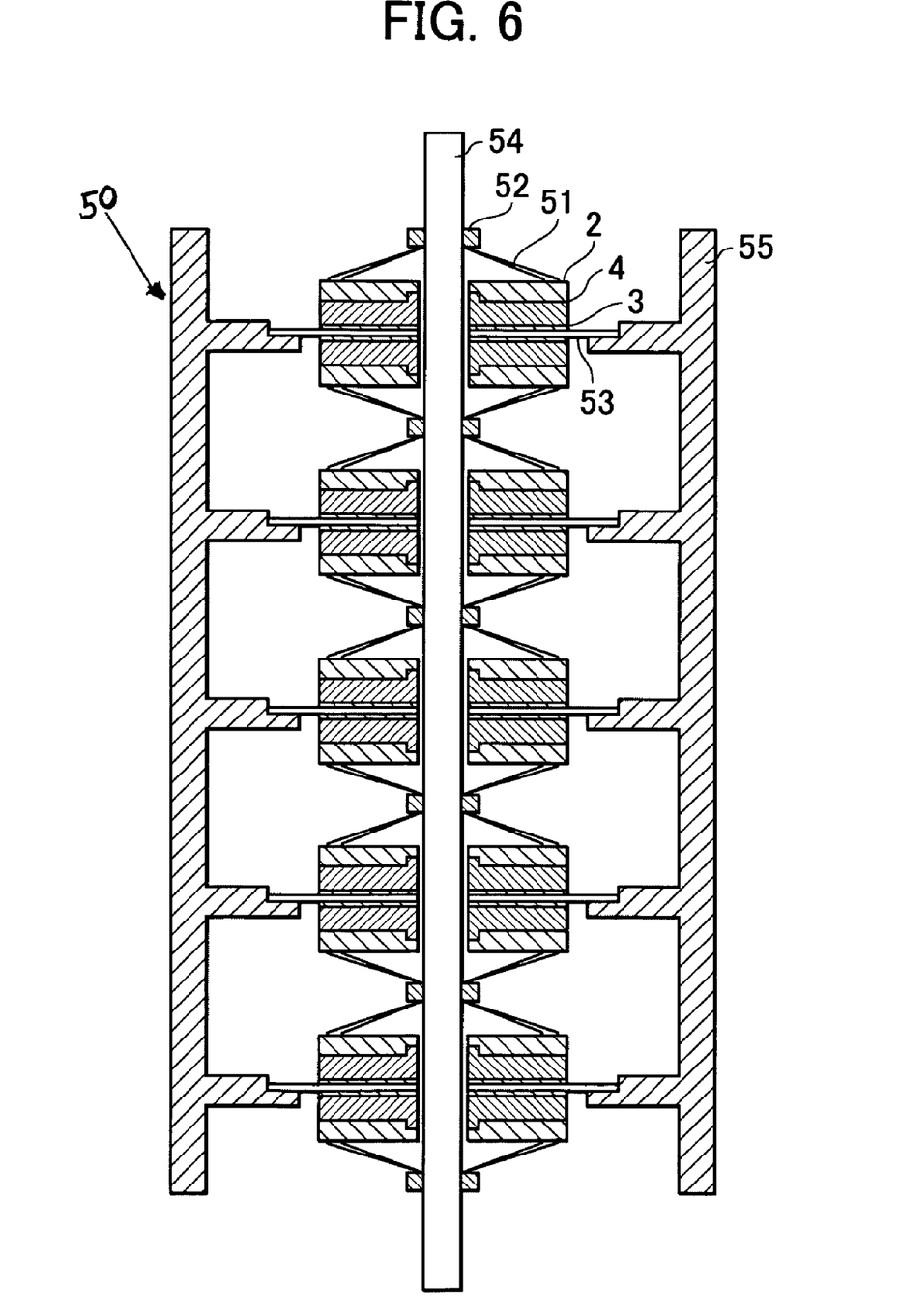
FIG. 6 is a sectional view showing, by way of example, a power transmitting mechanism according to a fifth embodiment of the present invention.

FIG. 6 is a sectional view of a power transmitting mechanism 50 according to a fifth embodiment of the present invention.

This fifth embodiment includes a plurality of power transmitting mechanisms shown in FIGS. 1A and 1B and has a through-hole formed at a center. A shaft 54 is adapted to fit through the respective central through-holes. Each piezoelectric device 3 is fixed to a support plate 53 on which a wiring pattern for supplying an AC voltage to the piezoelectric device 3 from the driving control circuit is printed. The embodiment shown in FIG. 6 includes ten vibrators fixed to a housing 55 via five support plates 53.

A nut 52 fixes a leaf spring 51 bonded thereto to the shaft 54. The movable member 2 is pressed by the leaf spring 51 and brought into pressure contact with the vibrator 1. The movable member 2, the leaf spring 51, the nut 52, and the shaft 54 are rotated together, while the movable member 2 and the shaft 54 are allowed to relatively move in the thrust direction. The vibrator 1 can rotate relative to the shaft 54 by configuring no contact between or by interposing a bearing (not shown) between the vibrator and the shaft.

The power transmitting mechanisms are arranged such that on both sides of the shaft 54 there are provide a pair of vibrators 1 are arranged inverted. As such, the number of the support plates 53 and nuts 52 is reduced, and efficient use of a space is realized.

When no AC voltages are supplied to all of the piezoelectric devices 3, all the movable members 2 are held in contact with the corresponding vibrators 1. With the rotation of the shaft 54 connected to the power generating source (not shown), therefore, rotating torque is transmitted to the housing 55 through the nuts 52, the leaf springs 51, the movable members 2, the vibrators 1, and the support plates 53 in order.

When AC voltages are supplied to all of the piezoelectric devices 3, levitation forces produced to act upon all the movable members 2 become larger than pressing forces applied from the leaf springs 52. Accordingly, all the movable members 2 and all the vibrators 1 are brought into a non-contact state. Hence, the rotating torque applied from the shaft 54 is not transmitted to the housing 55.

In the fifth embodiment, the efficiency in transmission of the rotating torque can be controlled by not only controlling the frequency and voltage of the AC voltage supplied to each of the piezoelectric devices 3, but also by changing the number of the piezoelectric devices 3 to which the AC voltages are supplied.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A driving device comprising:
   a first member coupled to a first structure;
   a second member coupled to a second structure, the second member including a piezoelectric device;
   a contactor exerting a contact force to bring said first member into contact with said second member;
   a driving source coupled to at least one of the first member via the first structure and the second member via the second structure, wherein the driving source drives at least one of the first structure and the second structure;
   an electrical signal source supplying an electrical signal to the piezoelectric device; and
   a control circuit coupled to the electrical signal source and controlling the electrical signal supplied to the piezoelectric device so as to generate a levitation force,
   wherein the control circuit controls the electrical signal so that a frictional force generated between the first member and the second member continuously changes by the levitation force.

2. A driving device according to claim 1, wherein the contactor includes a resilient member exerting a biasing force.

3. A driving device according to claim 2, wherein the resilient member exerts the biasing force on the first member to bring the first member into contact with the second member.

4. A driving device according to claim 1, wherein the the second member includes a vibrating body coupled to the piezoeleetric device, and wherein said vibrating body exciting an out-of-plane vibration in a surface of the second member when the electrical signal is supplied to the piezoelectrie device.

5. A driving device according to claim 4, wherein the out-of-plane vibration is a stationary wave.

6. A driving device according to claim 1, wherein the first and second members have contact and non-contact states, wherein in said contact state the contact force is greater than the levitation force to bring said first member into contact with said second member, and wherein in said non-contact state said levitation force is greater than said contact force to move said first member out of contact with said second member.

7. A method of controlling mechanical coupling of first and second structures into contact, said method comprising the following steps:
   coupling the first structure to a first member having a surface;
   coupling the second structure to a second member including a piezo electric device;
   pressing said first and second members together at said surface with a contact force such that a frictional force is generated between said first and second members;
   supplying an electrical signal to the piezoelectric device; and
   controlling the electrical signal supplied to the piezoelectric device so as to generate a levitation force and so that the frictional force generated between the first and second members continuously changes by the levitation force.

8. A method according to claim 7, further comprising:
   providing the second member having a vibrating body coupled coupled to the piezoelectric device,
   wherein the step of controlling the electrical signal supplied to the piezoelectric device includes controlling a magnitude of an out-of-plane vibration in the vibrating body, and therefore the magnitude of the levitation force.

9. A method according to claim 8, wherein the step of controlling the electrical signal includes controlling the magnitude of the levitation force to be less than the contact force so that the first and second member are in a contact state and controlling the magnitude of the levitation force to be greater than the contact force so that the first and second members are in a non-contact state.

10. A method according to claim 9, wherein the step of controlling the electrical signal includes controlling the magnitude of the levitation force relative to the contact force in order to control the frictional force between the first and second members.

11. A method according to claim 7, wherein the step of pressing the first and second members together includes biasing the first and second members together with a resilient member.

* * * * *